US006272565B1

(12) United States Patent
Lamberts

(10) Patent No.: US 6,272,565 B1
(45) Date of Patent: Aug. 7, 2001

(54) METHOD, SYSTEM, AND PROGRAM FOR REORDERING A QUEUE OF INPUT/OUTPUT (I/O) COMMANDS INTO BUCKETS DEFINING RANGES OF CONSECUTIVE SECTOR NUMBERS IN A STORAGE MEDIUM AND PERFORMING ITERATIONS OF A SELECTION ROUTINE TO SELECT AND I/O COMMAND TO EXECUTE

(75) Inventor: Bernd Lamberts, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,348

(22) Filed: Mar. 31, 1999

(51) Int. Cl.$^7$ .................................................. G06F 13/00
(52) U.S. Cl. .................. 710/43; 710/5; 710/39; 711/112; 360/72.2
(58) Field of Search ................... 710/3, 39, 40, 710/43, 52; 360/72.2; 711/158, 112

(56) References Cited

U.S. PATENT DOCUMENTS

| | | | |
|---|---|---|---|
| 4,425,615 | 1/1984 | Swenson et al. | 711/114 |
| 4,805,090 | 2/1989 | Coogan | 710/74 |
| 4,888,691 | 12/1989 | George et al. | 714/15 |
| 5,255,131 | 10/1993 | Coker et al. | 360/48 |
| 5,280,602 | 1/1994 | Holt | 711/4 |
| 5,426,736 | * | 6/1995 | Guineau, III | 710/56 |
| 5,440,716 | 8/1995 | Schultz et al. | 711/114 |
| 5,548,795 | 8/1996 | Au | 710/52 |
| 5,570,332 | 10/1996 | Heath et al. | 369/50 |
| 5,592,648 | 1/1997 | Schultz et al. | 711/114 |
| 5,594,926 | 1/1997 | Chang et al. | 710/52 |
| 5,603,063 | 2/1997 | Au | 710/52 |
| 5,603,066 | 2/1997 | Krakirian | 710/74 |
| 5,634,081 | 5/1997 | Krakirian | 710/74 |
| 5,664,143 | * | 9/1997 | Olbrich | 711/112 |
| 5,729,718 | 3/1998 | Au | 711/167 |
| 6,088,772 | * | 7/2000 | Harriman et al. | 711/158 |
| 6,112,265 | * | 8/2000 | Harriman et al. | 710/40 |
| 6,137,763 | * | 10/2000 | Dahan et al. | 369/95 |
| 6,145,052 | * | 11/2000 | Howe et al. | 711/112 |

* cited by examiner

Primary Examiner—Hiep T. Nguyen
Assistant Examiner—Hong Kim
(74) Attorney, Agent, or Firm—David W. Victor; Konrad Raynes & Victor LLP

(57) ABSTRACT

Disclosed is a system, method, and program for selecting an input/output (I/O) command in a queue of I/O commands. Each I/O command operates within a range of addressable locations on a storage medium. Each addressable location is defined according to a sector number and track number. The program makes use of a plurality of buckets, wherein each bucket represents a range of consecutive sector numbers. Each queued I/O command is associated with a bucket such that a sector number of an addressable location in which an I/O command operates is within the range of sectors comprising the associated bucket. A reference position is determined. A selection routine is then executed to select an I/O command. The selection routine selects a bucket including at least one I/O command and selects an I/O command within the selected bucket. The routine then determines whether the selected I/O command meets a selection criteria. The routine indicates the selected I/O command as the I/O command to process. Another iteration of the selection routine is performed after determining that the selected I/O command does not meet the selection criteria.

36 Claims, 5 Drawing Sheets

METHOD, SYSTEM, AND PROGRAM FOR REORDERING A QUEUE OF INPUT/OUTPUT (I/O) COMMANDS INTO BUCKETS DEFINING RANGES OF CONSECUTIVE SECTOR NUMBERS IN A STORAGE MEDIUM AND PERFORMING ITERATIONS OF A SELECTION ROUTINE TO SELECT AND I/O COMMAND TO EXECUTE

BACKGROUND OF THE INVENTION

1. Field of the Invention

The present invention relates to a method, system, and program for reordering a queue of input/output commands directed toward a storage medium in a manner that maximizes system throughput.

2. Description of the Related Art

A hard disk drive receives input/output (I/O) commands with respect to locations on the disk drive. The I/O commands may be received at a rate faster than they can be executed with respect to the disk drive storage medium. In such case, the I/O commands are queued. FIG. 1 illustrates the arrangement of a recording surface of a disk drive 2 divided into concentric circular "tracks" on the disk surface. If there are multiple disks, then the vertical alignment of the tracks, on the disks aligned in parallel, together comprise a cylinder. The outer cylinder is shown as reference 4. Each cylinder is further divided into user data sectors 6a–h and prerecorded servo sectors 8a–h. A logical block address ("LBA") is used to address a specific location within the disk stack and is mapped by the disk drive control electronics to a cylinder or track, head number indicating a particular head in a multi-disk system, and sector.

The positioning time or total access time for an individual command can be broken-up into sequential phases, referred to as seek time and latency time. Seek time is the timer period for the servo system to position the actuator from the current head and cylinder position to the new target head and cylinder position. The latency time represents the remaining time, after seek completes, to position the head over the target sector. A "rotational time" involves the time to rotate the sector from the source or current sector location to position the target sector under the transducer read/write head. The latency time is the combination of the seek time and rotational time required to position the read/write head over the sector location that is the subject of the I/O operation.

Thus, the total access time is determined by two time movement operations, the seek time for radial positioning and the rotational access time for circumferential positioning the head over the target sector. To insure that the read/write head is positioned over the target sector at the completion of the radial and rotational positioning operations, the seek time must always be less than the rotational time. Further details of how to calculate the seek and rotational times are described in U.S. Pat. No. 5,729,718, entitled "System for Determining Lead Time Latency as Function of Head Switch, Seek, and Rotational Latencies and Utilizing Embedded Disk Drive Controller for Command Queue Reordering," which patent is incorporated herein by reference in its entirety.

Queued I/O commands do not have to be executed in the order they are received. Thus, the queued I/O commands may be reordered to maximize throughput. One reordering method, termed "Shortest Seek Time First," or SSTF, reorders commands such that the command with the shortest seek time with respect to the command being executed is executed next. This reordering method only considers the time to move the head in a radial position between tracks. The problem with queueing methods that consider only the seek time or time to change the radial position is that they do not consider rotational delay to spin the disk to a different circumferential position.

Current rotational position ordering (RPO) methods reorder the queue to minimize the combination of seek time and rotational time, or optimize total throughput. U.S. Pat. Nos. 5,729,718 and 5,548,795, entitled "Method for Determining Command Execution Dependencies Within Command Queue Reordering Process," which patents are incorporated herein by reference in their entirety, describe an RPO method for queuing commands that considers both seek and rotational delay times. Each queued command includes a field to store the results in calculating the delay time with respect to a reference command, which is the command currently being executed at the head of the queue. This latency time is calculated for each queued command with respect to the command at the head of the queue, or n calculations in a queue of n I/O commands. The command having the shortest latency time is promoted to the position immediately following the head of the queue. This algorithm is then repeated and latency times are calculated with respect to the just promoted I/O command. Thus, with current RPO reordering techniques, calculations in the order of $n^2$ are performed to reorder the entire queue.

One problem with current RPO reordering techniques is the processor overhead needed to reorder the entire queue. Queue reordering operations can have significant affects on performance as the processing of I/O commands is delayed until the queue is reordered. Increases in the track storage capacity and number of addressable locations on the tracks results in likewise increases in the number of I/O commands directed to the storage device. It would be desirable to increase the queue length to accommodate the increase in I/O traffic associated with larger track capacity. However, one limitation on increasing the queue length is the time needed to reorder the queue. As the number of queued requests increases, the time to reorder the queue increases with the power of two. This increase in queue length in turn requires a substantial increase in the processing overhead to reorder the queue. Thus, one limitation on expanding the queue size in disk drives is the substantial increase in processor overhead needed to sort the longer queues.

Thus, there is a need in the art for an improved methodology for reordering I/O queues to accommodate increases in track capacity and the corresponding increase in queue length.

SUMMARY OF THE PREFERRED EMBODIMENTS

To overcome the limitations in the prior art described above, preferred embodiments disclose a system, method, and program for selecting an input/output (I/O) command in a queue of I/O commands. Each I/O command operates within a range of addressable locations on a storage medium. Each addressable location is defined according to a sector number and track number. The program makes use of a plurality of buckets, wherein each bucket represents a range of consecutive sector numbers. Each queued I/O command is associated with a bucket such that a sector number of an addressable location in which an I/O command operates is within the range of sectors comprising the associated bucket. A reference position is determined. A selection routine is then executed to select an I/O command. The selection routine selects a bucket including at least one I/O command and selects an I/O command within the selected bucket. The routine then determines whether the selected I/O command meets a selection criteria. The routine indicates the selected I/O command as the I/O command to process. Another iteration of the selection routine is performed after determining that the selected I/O command does not meet the selection criteria.

In further embodiments, if the disk file is not in use, then the reference position may be determined as a current position of a head with respect to an addressable location of the storage medium. If an I/O command is being executed against the storage medium, then the reference position is determined with respect to an addressable location where the head will be located at the completion of the execution of the current I/O command.

In still further embodiments, determining whether the selected I/O command meets the selection criteria would include estimating a seek time and rotational time. The seek time is the time to move from a track of the determined reference position to the track of the selected I/O command. The rotational time is the time to move from a sector number of determined reference position to the sector number of the selected I/O command. The selection criteria selects an I/O command to maximize throughput.

In yet further embodiments, determining whether the selected I/O command meets the selection criteria comprises determining whether the estimated seek time is greater than the estimated rotational time. This additional requirement selects a minimum rotational time within a bucket of I/O commands, such that the rotational time is greater than the seek time. This insures that the actuator head will not complete seeking before the disk rotates to the correct sector.

Preferred embodiments order the queue using a bucket grouping method that requires less than n calculations (where n is the number of queued requests) to select the next I/O command while maximizing throughput. This is advantageous over current rotational position ordering (RPO) techniques that would require on the order of $n^2$ computations. The preferred ordering or I/O command selection technique of the present invention is especially suitable for more recent disk drives with very high track capacities that need deeper I/O queues to accommodate the increase in I/O transaction traffic. With the preferred ordering technique of the present invention, the queue size can increase with minimal increases in the processor overhead needed to reorder the queue as the reordering calculations are sub n or sublinear. Current RPO techniques, on the other hand, that require computations in the order of $n^2$ would substantially increase processor overhead to reorder the queue. In fact, one of the impediments to increasing queue length with current RPO reordering techniques to accommodate deeper queues is the delay that would result from the substantial increase in reordering computations.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Disk Drive System

Figure 2:
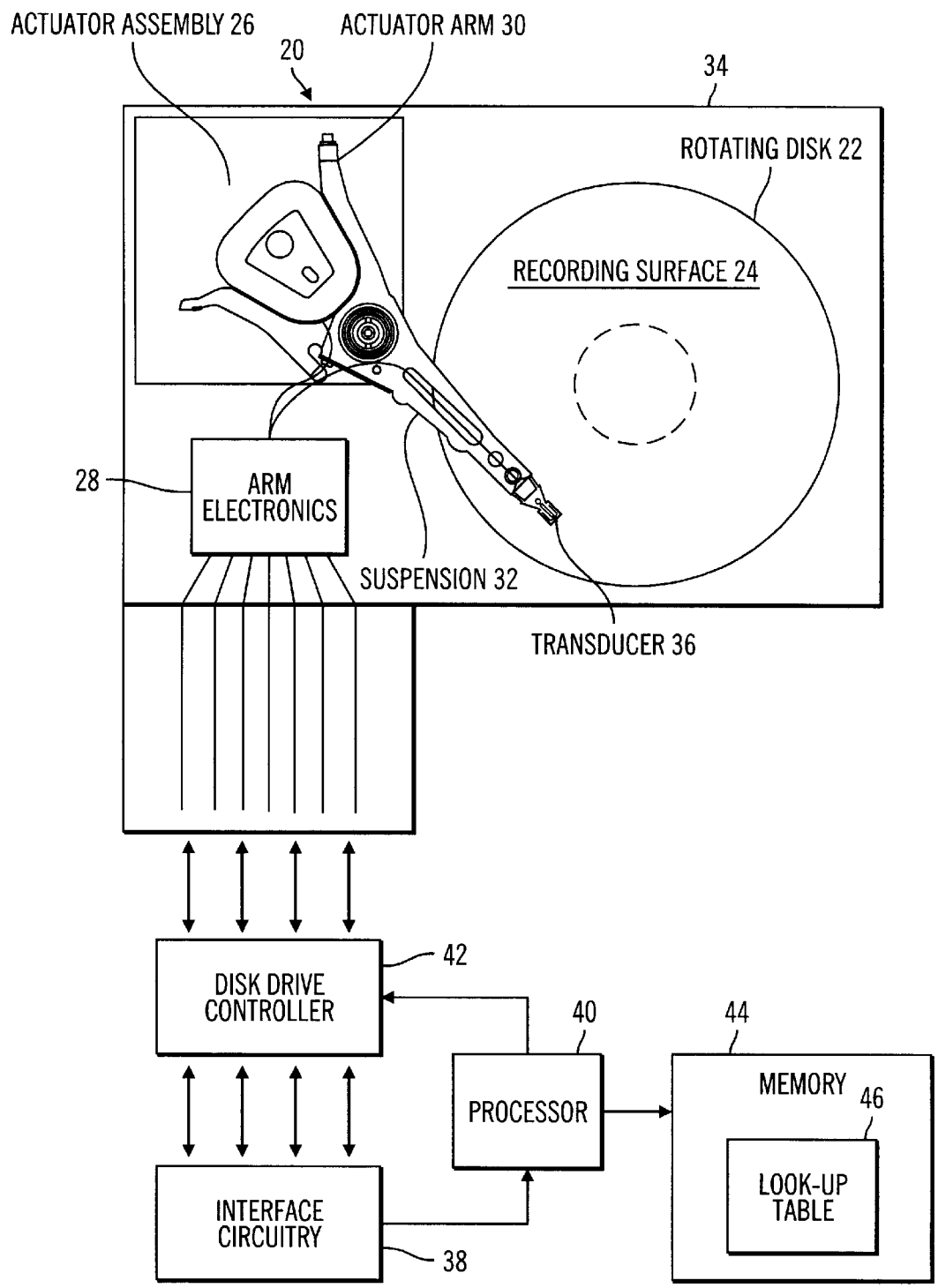
FIG. 2 illustrates a diagram of the hard disk drive components in which preferred embodiments of the present invention are implemented.

FIG. 2 illustrates a disk drive system 20 in which preferred embodiments are implemented. The disk drive system 20 comprises a rotating disk 22 having at least one recording surface 24 for storing information, a motor (not shown) for rotating the disk, an actuator assembly 26, arm electronics 28, an actuator arm 30, at least one suspension 32 connected to the arm 30, and a housing 34. The arm electronics 28 transmits electrical positioning information to position the actuator arm 30 in a plane substantially parallel to the recording surface 24, causing the suspension 32 to move along an arcuate path over the surface 24. A transducer 36 is held in close proximity to the recording surface 24 to read and write data to the disk. The transducer 36 may comprise a magnetoresistive (MR) read/write head or multiple head structure as known in the art. The design and arrangement of disk drive systems are further described in "Magnetic Disk Drive Technology: Heads, Media, Channel, Interfaces, and Integration," by Kanu G. Ashar (1997), which publication is incorporated herein by reference in its entirety.

Figure 1:
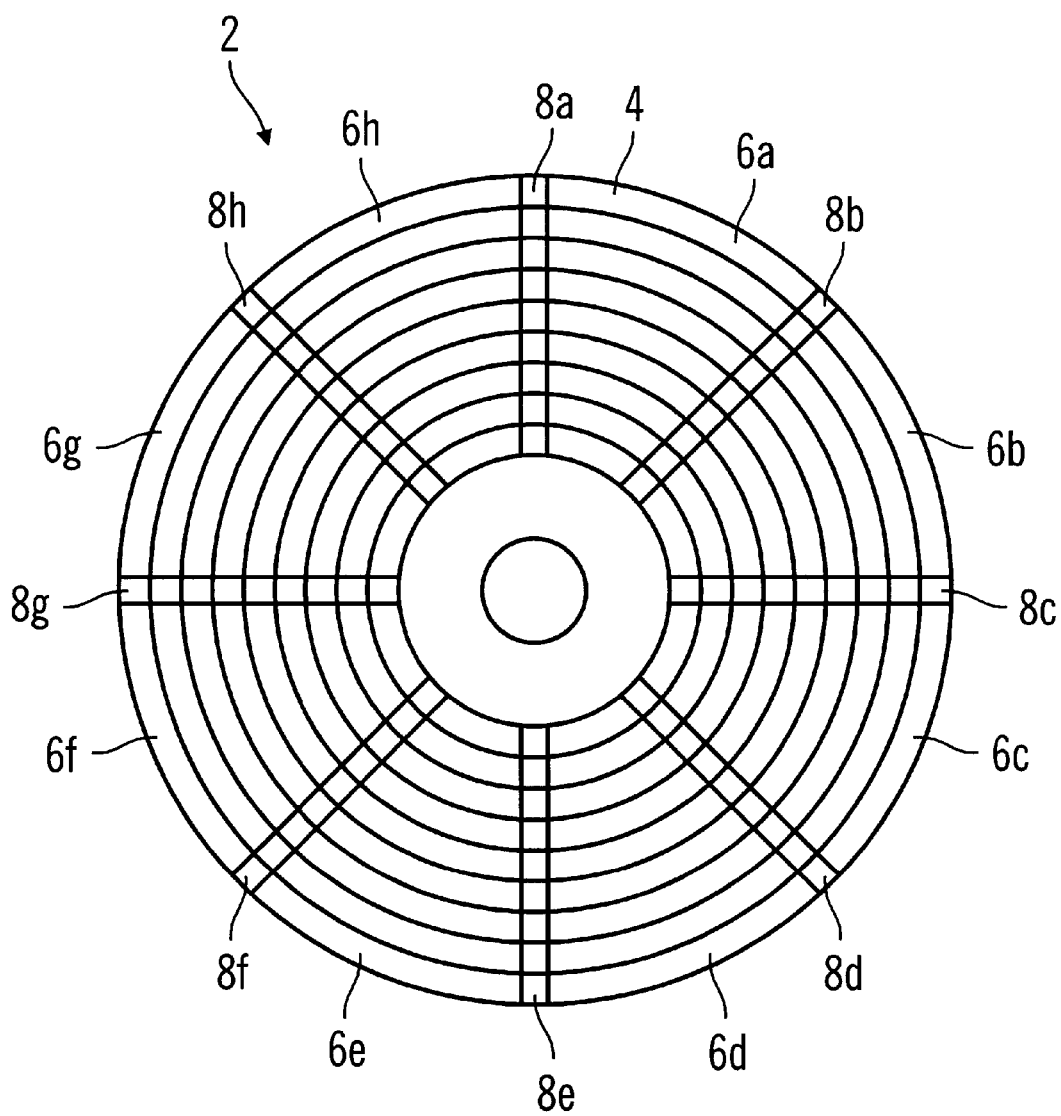
FIG. 1 is a block diagram that illustrates the arrangement of data within a recording disk in accordance with the prior art.

Data may be stored on the storage medium surface 24 in concentric tracks as shown with respect to FIG. 1. In such an arrangement, user data record positions are formed as data sectors or blocks within a multiplicity of concentric data tracks defined on each storage surface. Data is transferred from an external device, such as a computer bus, to interface circuitry 38. A processor 40 controls the flow of data received at the interface circuitry 38 to a disk drive controller 42, which then controls the transfer of the data to or from the recording surface 24. The processor 40 may be any suitable controller, microprocessor or other processing device capable of performing the operations described herein. The processor 40 receives I/O commands via the interface circuitry 38 and may queue the commands within a queue data structure stored in memory 44. A read/write channel within the disk drive controller 42 encodes data for storage into a form suitable for the storage medium of the recording surface 24. This encoded data is then transmitted to the arm electronics 28, and then to the transducer head 36 for writing on the recording surface 24. When the transducer 36, e.g., MR head, senses or reads data from the recording surface 24, the data is transmitted in the encoded form via the arm electronics 28 to the channel within the disk drive controller 42 for "decoding" into a form that is understandable to the device at the other end of the interface circuitry 38.

In further embodiments, data may be stored on both surfaces of the disk 22. In such case, there would be multiple suspensions connected to the arm with transducer heads to read and write on both surfaces of the disk. Moreover, as known in the art, the disk drive may include a stack or platters of disks that are mounted in parallel on a spindle for simultaneous rotation. In such case, there would be multiple heads, one for each recording surface of each disk in the stack. In these multi-platter systems, a cylinder is formed of the combination of concentric rings on multiple disks along the same vertical axis.

Locations on the disk 22 are identified according to track or cylinder, head, and sector information. The tracks are the concentric circles on the disk 22. The tracks are numbered, starting from zero at the outside of the platter and increasing for tracks located inward. Data is accessed by moving the transducer head 36 radially among the circular tracks. In multiplatter systems, the head information indicates the head and disk at which to perform I/O operations. Each track may be further divided into individually accessible sectors, which are typically 512 byte blocks of data. In systems where there is a stack of disks, i.e., multiple platters, the radial position is defined by a cylinder which is formed from all the tracks on all the disks in the stack at the same radial position. A read or write command, such as a SCSI command, typically includes a starting LBA address of the command and a transaction length. The disk drive controller 42 maps the LBA to a cylinder, sector, and head to locate a specific data position on one of the disks.

In embedded servo systems, the disk surface 24 also includes wedges of servo identification information (SID) to identify the circumferential position on the disk. The wedges of SID markings are illustrated as 8a–8h in FIG. 1. When the transducer head 36 arrives at an SID, the SID information is used by the drive electronics to adjust the actuator 30 position to correct for any errors or determine circumferential slices of tracks. Multiple disk or platter systems and SID commands are further described in the commonly assigned patent, U.S. Pat. No. 5,255,131, entitled "Asynchronous Servo Identification/Address Mark Detection For PRML Disk Drive System," which patent is incorporated herein by reference in its entirety.

Queuing I/O Commands

Figure 3:
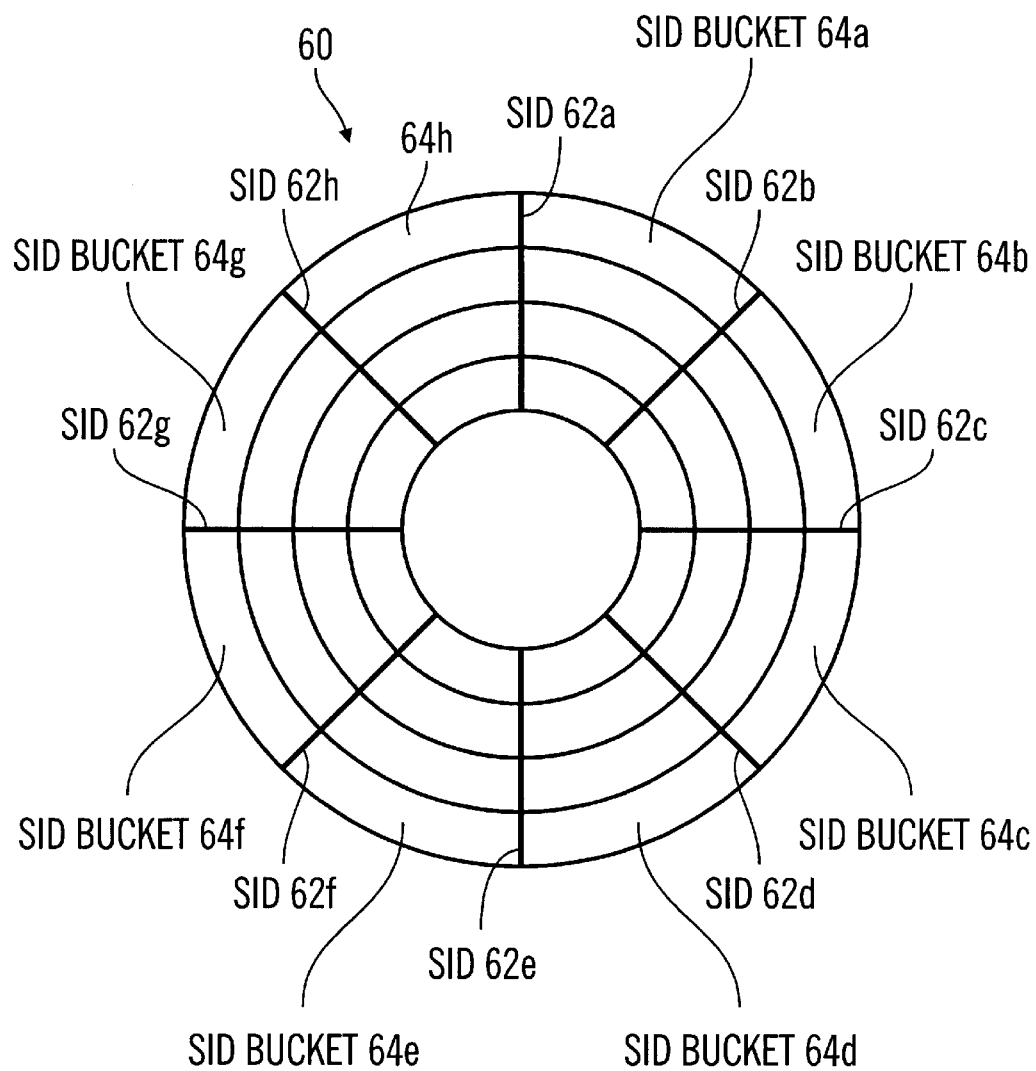
FIG. 3 illustrates the arrangement of data within a recording disk in accordance with preferred embodiments of the present invention.

FIG. 3 illustrates a disk, including multiple tracks and SID sections 62a, b, c, d, e, f, g, and h that define circumferential reference points on a track. The track is divided into SID buckets 64a, b, c, d, e, f, g, and h, wherein each SID bucket 64a, b, c, d, e, f, g, and h for a track is defined as all sectors on the track between two SID sections 62a, b, c, d, e, f, g, and h. Thus, each SID bucket defines a group of concurrent sectors on each track or is a range of sectors on each track. In this way, the circumferential address space is segmented in the SID bucket groups. For example, SID bucket 64a contains all sectors for all tracks between SID sections 62a and 62b. An I/O command that starts at a target location, identified according to track and sector, may be classified as falling within a specific SID bucket 64a–h based on the sector position of the start of the I/O command. Addressable location sector numbers, other than the starting sector number for the I/O command, may be used to determine the associated SID bucket for the I/O command.

The processor 40 stores in memory 44 a look-up table that lists commands by the SID bucket 64a–h in which the starting address of the I/O command falls. The look-up table would indicate by SID bucket 64a–h those I/O commands having a starting sector number that falls within the range of sector addresses of an SID bucket 64a, b, c, d, e, f, g or h. The range of sector addresses in SID Bucket i includes sector addresses between SIDs i and (i+1). For instance, the rows of the look-up table may be comprised of the different SID buckets and the columns would include the I/O commands that fall within the buckets.

Figure 4:
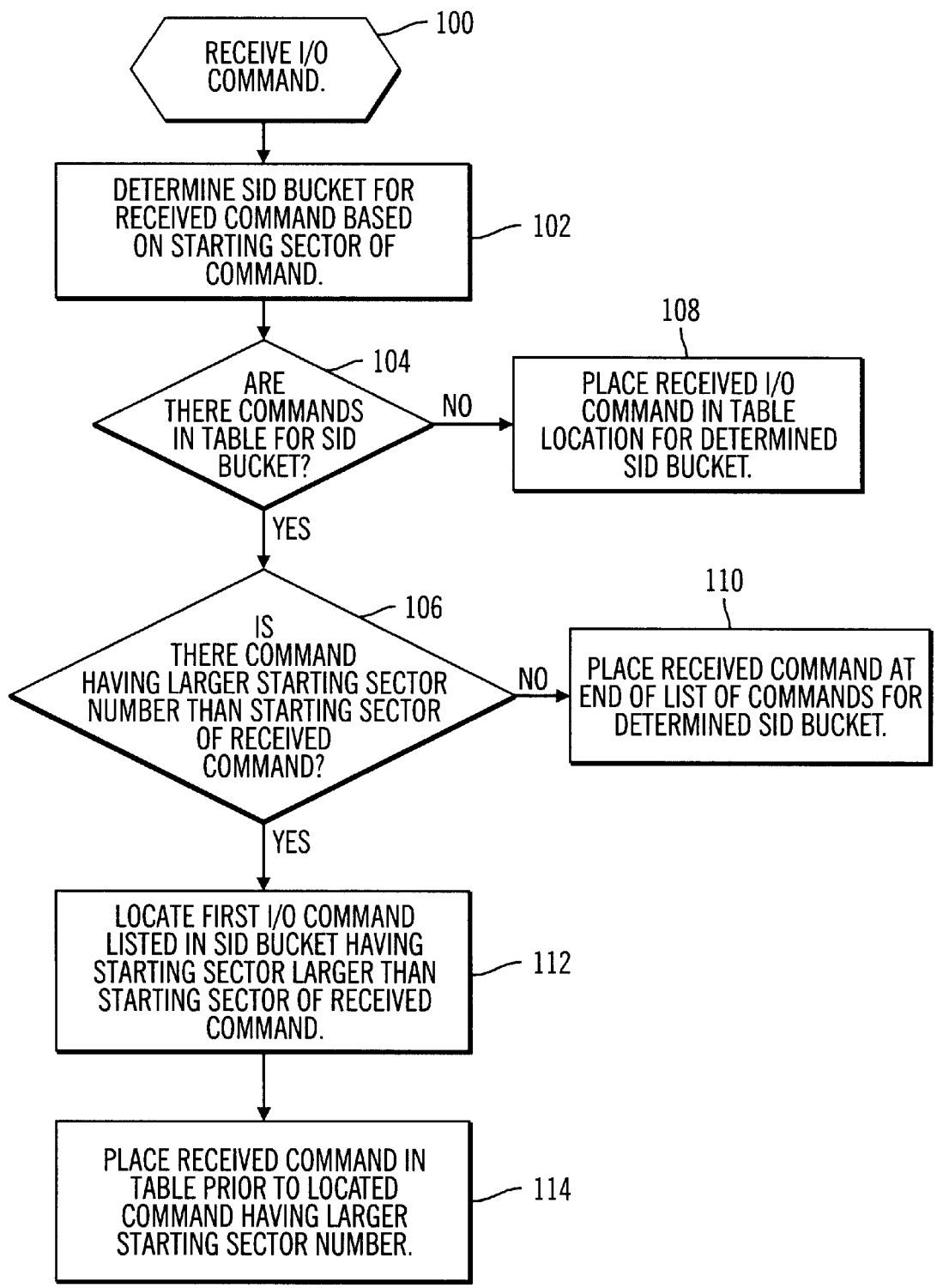
FIG. 4 illustrates logic to queue received I/O commands in accordance with preferred embodiments of the present invention.

FIG. 4 illustrates logic implemented by the processor 40 to enqueue I/O commands in the look-up table. This logic may be embedded in a memory location storing microcode for the processor 40, e.g., a ROM, PROM, EPROM, etc. In preferred embodiments, I/O commands are queued by SID bucket according to the sector number of the start of the I/O command. I/O commands in any given SID bucket can be ordered according to sector number or according to any other ordering scheme known in the art, e.g., FIFO, stacked at the end of a linked list, etc. Control begins at block 100 where the processor 40 receives an I/O command. Control transfers to block 102 where the processor 40 determines the SID bucket 64a–h for the received command based on the sector number of the starting address of the I/O command, i.e., the start of the read or write operation. The processor 40 would know the range of sectors included within each SID bucket 64a–h and determine which bucket the I/O command falls within based on the starting sector number of the received I/O command. Control transfers to block 104 where the processor 40 determines whether there are I/O commands already queued in the look-up table for the determined SID bucket 64a–h. If so, control transfers to block 106; otherwise, control transfers to block 108 to place the received I/O command in the look-up table at a location for the determined SID bucket, e.g., the first column of the row for the determined SID bucket 64a–h. After block 108, the just queued I/O command is the first command for that SID bucket.

If there are already queued commands for the determined SID bucket, at block 106, the processor 40 determines whether there is at least one I/O command having a starting sector that is greater than the starting sector of the received I/O command. If not, control transfers to block 110 to place the received I/O command in the table at the end of the list or queue of I/O commands for the determined SID bucket. If there are commands having a larger starting sector number, then at block 112, the processor 40 locates the first I/O command in the list for the determined SID bucket having a starting sector number larger than the starting sector number of the received I/O command. As the commands are ordered according to sector number, the first such command located in the list is the I/O command having the smallest sector number that is still larger than the starting sector number of the received I/O command. Control then transfers to block 114 where the processor 40 enqueues the received command in the table in the queue prior to the located command having the larger starting sector number. In this way, I/O commands are inserted or enqueued in the look-up table by SID bucket 64a–h, and within each SID bucket in ascending order of the starting sector number of the I/O commands. However, in alternative embodiments, to conserve computing resources, I/O commands within a bucket may not be reordered and may instead be stacked on a linked list or placed in the queue using an alternative stacking algorithm.

Figure 5:
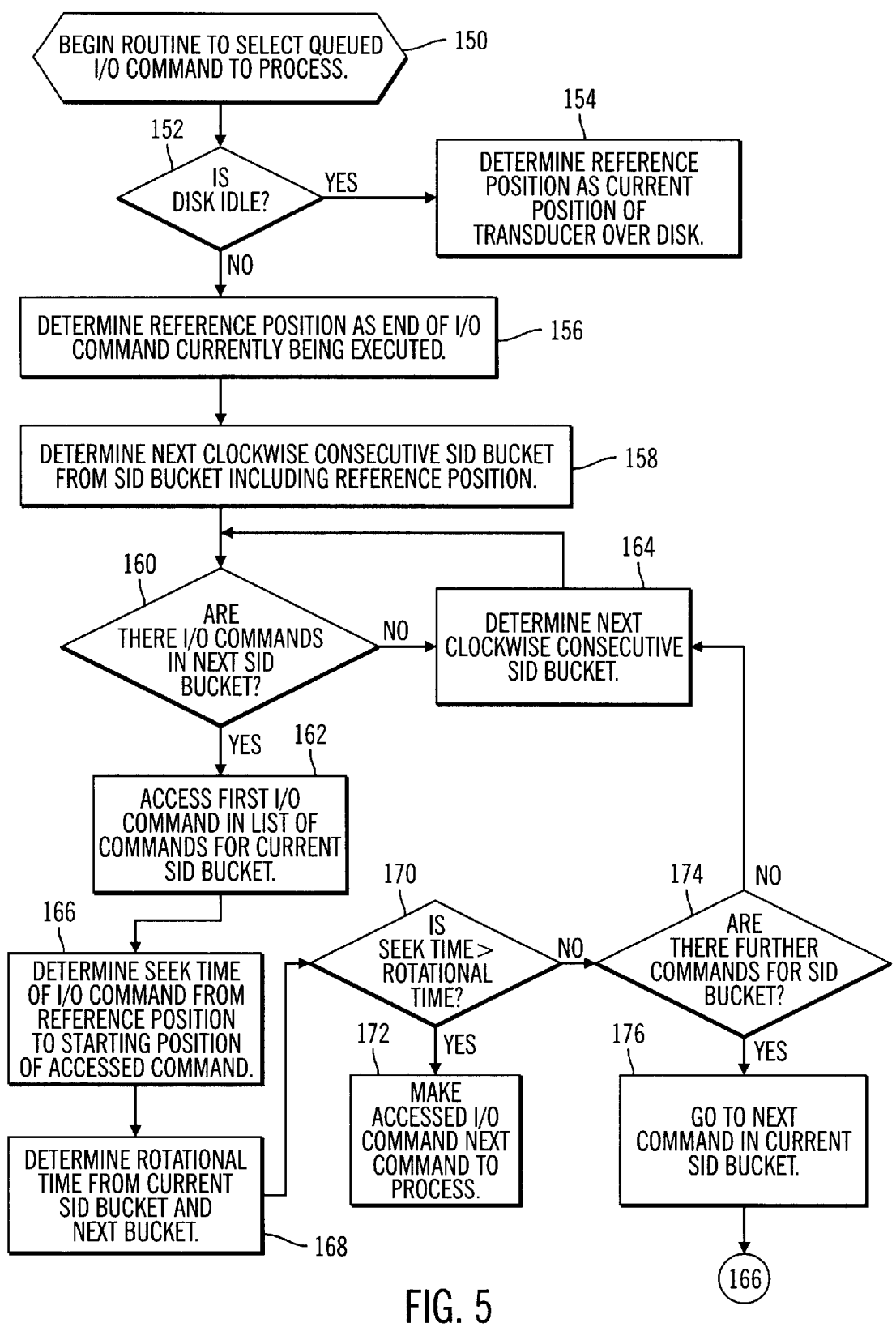
FIG. 5 illustrates logic to reorder or select a next I/O command to optimize latency in accordance with preferred embodiments of the present invention.

FIG. 5 illustrates logic embedded within memory 44 and implemented by the processor 40 to reorder queued I/O commands to optimize throughput and reduce latency time, which, as discussed, is a combination of seek time and rotational time. Control begins at block 150 where the processor 40 begins a routine to select a queued I/O command to process. The processor 40 then determines (at block 152) whether the disk is idle, i.e., there is no I/O command currently being executed against the disk 24. If so, the processor 40 determines (at block 154) a reference position as the current position of the transducer head 36 over the disk, according to sector, head, and track. Otherwise, if an I/O command is currently being performed (at block 156), the reference position is the SID location where the current executing I/O command will complete, i.e., the end of the currently executing read or write operation as indicated in the executing I/O command. In preferred embodiments, the determination of the I/O command to process can be determined just-in-time when an I/O command needs to be selected, such as when the disk file is idle or while another I/O command is executing. After determining the reference position, control transfers to block 158 where the processor 40 determines the next clockwise consecutive SID bucket (i+1) next to the current SID bucket i including a sector number of the determined reference position. In preferred embodiments, the next SID bucket is always checked for the next I/O command to process even if there are additional I/O commands queued in the current SID bucket. This rule insures compliance with the condition in block 170 that the rotational time to access the start location of the next I/O command to process is greater than the seek time as the rotational time between commands in the same bucket is typically so minimal that it would likely never exceed the seek time.

Control then transfers to block 160 where the processor 40 determines whether there are I/O commands in the next consecutive SID bucket (i+1). If so, control transfers to block 162; otherwise, control transfers to block 164 to determine the next clockwise, consecutive SID bucket. From block 164, control transfers back to block 160 to consider this next SID bucket. At block 162, the processor 40 accesses the first I/O command queued for the current SID bucket. Control transfers to block 166 where the processor 40 estimates the seek time of the accessed I/O command with respect to the determined reference position, i.e., the time to move from the cylinder or track of the reference position to the accessed I/O command being considered. Seek time may also include the "head switch time," or time to switch from using one head to another if the accessed I/O command is on another recording surface from the current active head. The seek time may be determined in a manner known in the art. The seek time may be a predetermined value based on the physical behavior of the servo controller and disk drive electronics or be empirically derived. In preferred embodiments, the determinations of seek and rotational times are made during the execution of the logic of FIG. 5 as selection of the I/O command to process next requires the determination of a current reference position with respect to the transducer head 36.

Control then transfers to block 168 where the processor 40 estimates the rotational time to transfer from the reference position sector to the starting sector of the accessed I/O command, assuming that disk rotational time is constant. In preferred embodiments, the rotational time may be estimated as the distance between the beginning of the SID bucket including the determined reference position and the start of the SID bucket associated with the accessed I/O command. Equation (1) shows the rotational time R between buckets, where T is the time required for one revolution:

$$R = T/(\text{number of SID buckets}) \qquad (1)$$

Thus, if the next SID bucket including the accessed I/O command is only one SID bucket from the SID bucket including the head I/O command, the rotational time is estimated as R. Note, that because in preferred embodiments, the I/O commands within an SID bucket are in ascending ordered according to sector number, the accessed I/O command within a bucket according to the logic of FIG. 5 has the least rotational time from the determined reference position as the accessed I/O command has the smallest sector number in the SID bucket of I/O commands not yet considered.

The rotational time may be estimated more accurately by estimating the time to rotate from the end sector of the currently executing I/O command to the starting sector of the accessed I/O command.

After estimating the seek and rotational times, i.e., latency, control transfers to block 170 where the processor 40 determines whether the estimated seek time is greater than the estimated rotational time. If so, control transfers to block 172 to make the current accessed I/O command the next I/O command to process.

Otherwise, control transfers to block 174 to determine whether there are further I/O commands in the current SID bucket not yet considered. If so, control transfers to block 176 to access the next I/O command within the current bucket and then back to block 166 to determine whether this next accessed I/O command satisfies the selection criteria. If there are no unconsidered I/O commands in the SID bucket under consideration, then control transfers to block 164 to determine the next consecutive SID bucket and any I/O commands therein.

With the logic of FIG. 5, the next I/O command to execute is selected to maximize throughput and, at the same time, insure that the estimated seek time is greater than the estimated rotational time. The purpose of the latter condition, that the seek time is greater than the rotational time, is to insure that the head 36 does not reach the desired cylinder until the disk is at the proper rotational position or sector number. Otherwise, the head 36 will remain idle at the target destination and not perform the requested read/write operation. Errors may occur if the head 36 reaches its destination before the disk is rotated to the correct sector position where the operation may be performed.

In further embodiments, if there are two I/O commands having the same rotational time, i.e., have the same sector number, then the algorithm may select the I/O command having the shortest seek time. Such a method would have advantages because the shorter the seek time, the greater the likelihood of a successful read/write operation.

With preferred embodiments, the RPO reordering process requires at most n operations, or is a sublinear process. As discussed, current RPO techniques can take in the order of $n^2$ operations, which causes substantial increases in processor overhead to reorder as the queue size increases. With the logic of FIGS. 4 and 5, RPO reordering does not consume significant overhead, thereby allowing the queue size to increase substantially without seriously degrading performance. In fact, with the preferred reordering and command selection technique, queue size can be expanded by a factor of 100 or 1,000 without causing problematic increases in processor overhead.

Moreover, as track capacity increases, the likelihood of finding an I/O command in the next consecutive SID bucket that satisfies the reordering conditions of FIG. 5 increases because there are more I/O commands distributed in the SID buckets 64*a–h*. Thus, with the preferred logic, as track capacity increases, the number of computations to reorder the queue using RPO techniques further decreases. Thus, with the preferred logic, processor overhead devoted to reordering operations actually decreases as the track capacity and I/O command traffic directed toward the disk increases. Current reordering techniques, on the other hand, require substantially more calculation operations as the track capacity and number of queued requests increases. Thus, the preferred logic for reordering the queue is particularly suited for new hard disk drive technology that is continually increasing the track capacity and number of addressable locations to store data.

The logic of FIGS. 4 and 5 may be embedded in the disk 24 and/or a memory device accessible to the processor 40. The memory device including the control logic of FIGS. 4 and 5 may be comprised of a flash memory device or other configurable memory device. In this way, code to implement the logic of FIGS. 4 and 5 may be downloaded from over a network or retrieved from another storage device and stored directly in the memory device and/or disk 22 for access by the processor 40 to perform the operations described with respect to FIGS. 4 and 5.

Alternative Embodiments\Conclusion

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

The logic of the preferred embodiments may be implemented in code that is capable of being transmitted from a server over a network, such as the Internet, to the disk drive electronics to reprogram the memory device storing the code for the processor 40. In this way, the code in the disk drive may be updated over a network.

Preferred embodiments were described as using embedded servo techniques to store the servo information indicating circumferential position on the disk surfaces. In alternative embodiments, other techniques may be used to place the servo information in the disk drive. In such case, there would have to be an alternative mechanism for determining the start and end of each SID bucket.

Preferred embodiments were described with respect to I/O commands queued against a hard disk drive. In alternative embodiments, the storage medium against which I/O commands are queued may be any suitable storage medium known in the art, such as tape cartridges, optical disk drives, holographic storage medium, CD-ROM, and any other non-volatile and volatile storage mediums known in the art.

In the preferred logic of FIG. 5, the reordering algorithm is performed to select an I/O command to process when the disk file is idle or when a current I/O command is being processed and the next I/O command needs to be selected. In alternative embodiments, the reordering operation may be performed at other times to select an I/O command to process. Further, the ordering may be determined for numerous I/O commands in advance of the time such I/O commands are to be processed.

The logic of FIG. 5 implemented an RPO selection criteria that required the estimated rotational time to be greater than the estimated seek time to accomplish certain advantages and avoid the situation where the read/write head would be positioned to the target track before the disk rotated to the target sector. In alternative embodiments, alternative selection criteria may be used to select a command that is different from the condition requiring the seek time to be greater than the rotational time.

In summary, preferred embodiments disclose a system, method, and program for selecting an input/output (I/O) command in a queue of I/O commands. Each I/O command operates within a range of addressable locations on a storage medium. Each addressable location is defined according to a sector number and track number. The program makes use of a plurality of buckets, wherein each bucket represents a range of consecutive sector numbers. Each queued I/O command is associated with a bucket such that a sector number of an addressable location in which an I/O command operates is within the range of sectors comprising the associated bucket. A reference position is determined. A selection routine is then executed to select an I/O command. The selection routine selects a bucket including at least one I/O command and selects an I/O command within the selected bucket. The routine then determines whether the selected I/O command meets a selection criteria. The routine indicates the selected I/O command as the I/O command to process. Another iteration of the selection routine is performed after determining that the selected I/O command does not meet the selection criteria.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for selecting an input/output (I/O) command in a queue of I/O commands, wherein each command operates within a range of addressable locations on a storage medium, and wherein each of the addressable locations is defined according to at least a sector number and track number, comprising:

providing a plurality of buckets, wherein each bucket represents a range of consecutive sector numbers, and wherein the queued I/O commands are associated with a bucket such that a sector number of an addressable location in which an I/O command operates is within the range of consecutive sector numbers comprising the associated bucket;

determining a reference position;

executing a selection routine to select an I/O command to execute against the storage medium by performing:
  (i) selecting a bucket including at least one I/O command;
  (ii) selecting an I/O command within the selected bucket;
  (iii) determining whether the selected I/O command meets a selection criteria based on the reference position;
  (iv) indicating the selected I/O command as the I/O command to process after determining that the selected I/O command meets the selection criteria; and
  (v) performing another iteration of the selection routine after determining that the selected I/O command does not meet the selection criteria.

2. The method of claim 1, wherein the reference position is a current position of a head with respect to an addressable location of the storage medium.

3. The method of claim 1, wherein a current I/O command is executed against the storage medium when the reference position is being determined, wherein the reference position is determined with respect to an addressable location where a head will be located at the completion of the execution of the current I/O command.

4. The method of claim 1, wherein performing another iteration of the selection routine comprises:
   determining whether there are further I/O commands in the selected bucket not yet selected for consideration by the routine;
   repeating the selection routine for I/O commands in the selected bucket after determining that there are further I/O commands not yet considered in the selected bucket; and
   selecting another bucket and repeating the selection routine for I/O commands in the selected bucket after determining that all the I/O commands in the previously selected bucket were considered.

5. The method of claim 4, wherein selecting another bucket after determining that all the I/O commands in the previously selected bucket were considered comprises selecting a bucket whose starting sector number is consecutive with respect to the last sector number in the previously selected bucket.

6. The method of claim 1, wherein a bucket is associated with an I/O command such that the sector number of the starting addressable location of the I/O command operation is within the range of sector numbers comprising the associated bucket.

7. The method of claim 1, wherein the selected bucket during a first iteration of the selection routine is a bucket whose starting sector number is consecutive with respect to the last sector number in the initial bucket.

8. The method of claim 1, wherein determining whether the selected I/O command meets the selection criteria comprises:
   estimating a seek time to move from a track of the determined reference position to the track of the selected I/O command; and
   estimating a rotational time to move from a sector number of the determined reference position to the sector number of the selected I/O command, wherein the selection criteria selects an I/O command to minimize throughput.

9. The method of claim 8, wherein determining whether the selected I/O command meets the selection criteria further comprises determining whether the estimated seek time is greater than the estimated rotational time.

10. The method of claim 1, wherein a determining sector number is the sector number used to determine a bucket associated with an I/O command such that the determining sector number is within the range of sector numbers comprising the associated bucket, and wherein selecting an I/O command within the selected bucket to apply the selection criteria comprises selecting an I/O command such that the determining sector number of the selected I/O command is the minimum value of the determining sector numbers of all the not yet considered I/O commands in the selected bucket.

11. The method of claim 10, wherein the determined sector number is a sector number at which the I/O command begins.

12. The method of claim 10, wherein I/O commands are ordered in a queue in a bucket according to sector number used to determine the associated bucket, and wherein selecting an I/O command in the bucket to consider comprises selecting the I/O command in the queue following the previously selected command.

13. A system for selecting input/output (I/O) command for execution from a queue of I/O commands, comprising:
   a processor;
   a memory accessible to the processor;
   a storage medium including addressable locations, wherein each of the addressable locations is defined according to a sector number and track number, wherein the I/O commands operate within a range of addressable locations on the storage medium; and
   control logic embedded in the memory and executed by the processor, comprising:
      (i) means for determining a plurality of buckets, wherein each bucket represents a range of consecutive sector numbers on the storage medium;
      (ii) means for associating I/O commands to a bucket such that a sector number of an addressable location in which an I/O command operates is within the range of consecutive sectors comprising the associated bucket;
      (iii) means for determining a reference position;
      (iv) means for executing a selection routine to select an I/O command based on the determined reference position to execute against the storage medium after a first I/O command; and
      (v) means for performing another iteration of the selection routine after determining that the selected I/O command does not meet the selection criteria.

14. The system of claim 13, wherein the system further comprises a head which performs one of a read and write operation at an addressable location, wherein the reference position is a current position of the head with respect to an addressable location of the storage medium.

15. The system of claim 13, wherein the system further comprises a head which performs one of a read and write operation at an addressable location, wherein a current I/O command is executed against the storage medium when the reference position is being determined, and wherein the reference position is determined with respect to an addressable location where the head will be located at the completion of the execution of the current I/O command.

16. The system of claim 13, wherein the means for executing the selection routine to select a second I/O command comprises:
   means for selecting a bucket including at least one I/O command;
   means for selecting an I/O command within the selected bucket;
   means for determining whether the selected I/O command meets the selection criteria; and
   means for indicating the selected I/O command as the I/O command to execute after determining that the selected I/O command meets the selection criteria.

17. The system of claim 13, wherein the means for performing another iteration of the selection routine comprises:
   means for determining whether there are further I/O commands in the selected bucket not yet selected for consideration by the routine;
   means for repeating the selection routine for I/O commands in the selected bucket after determining that there are further I/O commands not yet considered in the selected bucket; and means for selecting another bucket and repeating the selection routine for I/O commands in the selected bucket after determining that all the I/O commands in the previously selected bucket were considered.

18. The system of claim 17, wherein the means for selecting another bucket after determining that all the I/O commands in the previously selected bucket were considered comprises selecting a bucket whose starting sector number is consecutive with respect to the last sector number in the previously selected bucket.

19. The system of claim 13, wherein a bucket is associated with an I/O command such that the sector number of the starting addressable location of the I/O command operation is within the range of sector numbers comprising the associated bucket.

20. The system of claim 13, wherein the selected bucket during a first iteration of the selection routine is a bucket whose starting sector number is consecutive with respect to the last sector number in the initial bucket.

21. The system of claim 13, wherein the means for determining whether the selected I/O command meets the selection criteria comprises:
  means for estimating a seek time to move from a track of the determined reference position to the track of the selected I/O command; and
  means for estimating a rotational time to move from the sector number of the initial I/O command to the sector number of the selected I/O command, wherein the selection criteria selects an I/O command to minimize latency.

22. The system of claim 21, wherein the means for determining whether the selected I/O command meets the selection criteria further comprises determining whether the estimated seek time is greater than the estimated rotational time.

23. The system of claim 13, where the storage medium is a member of the set of storage medium comprising a hard disk drive, tape cartridge, optical disk drive, holographic storage unit, CD-ROM, and volatile memory device.

24. The system of claim 13, wherein the memory is a configurable memory device and wherein the control logic further comprises means for receiving control logic code from a storage device external to the system and means for storing the received control logic code in the memory.

25. An article of manufacture for use in programming a controller to select an input/output (I/O) command in a queue of I/O commands, wherein each command operates within a range of addressable locations on a storage medium, wherein each of the addressable locations is defined according to a sector number and track number, the article of manufacture comprising a controller accessible storage medium including at least one program embedded therein that is capable of causing the controller to perform:
  providing a plurality of buckets, wherein each bucket represents a range of consecutive sector numbers, and wherein the queued I/O commands are associated with a bucket such that a sector number of an addressable location in which an I/O command operates is within the range of consecutive sector numbers comprising the associated bucket;
  determining a reference position; and
  executing a selection routine to select an I/O command to execute against the storage medium by performing:
    (i) selecting a bucket including at least one I/O command;
    (ii) selecting an I/O command within the selected bucket;
    (iii) determining whether the selected I/O command meets a selection criteria based on the reference position;
    (iv) indicating the selected I/O command as the I/O command to process after determining that the selected I/O command meets the selection criteria; and
    (v) performing another iteration of the selection routine after determining that the selected I/O command does not meet the selection criteria.

26. The article of manufacture of claim 25, wherein the reference position is a current position of a head with respect to an addressable location of the storage medium.

27. The article of manufacture of claim 25, wherein a current I/O command is executed against the storage medium when the reference position is being determined, wherein the reference position is determined with respect to an addressable location where a head will be located at the completion of the execution of the current I/O command.

28. The article of manufacture of claim 25, wherein performing another iteration of the selection routine comprises:
  determining whether there are further I/O commands in the selected bucket not yet selected for consideration by the routine;
  repeating the selection routine for I/O commands in the selected bucket after determining that there are further I/O commands not yet considered in the selected bucket; and
  selecting another bucket and repeating the selection routine for I/O commands in the selected bucket after determining that all the I/O commands in the previously selected bucket were considered.

29. The article of manufacture of claim 28, wherein selecting another bucket after determining that all the I/O commands in the previously selected bucket were considered comprises selecting a bucket whose starting sector number is consecutive with respect to the last sector number in the previously selected bucket.

30. The article of manufacture of claim 25, wherein a bucket is associated with an I/O command such that the sector number of the starting addressable location of the I/O command operation is within the range of sector numbers comprising the associated bucket.

31. The article of manufacture of claim 25, wherein the selected bucket during a first iteration of the selection routine is a bucket whose starting sector number is consecutive with respect to the last sector number in the initial bucket.

32. The article of manufacture of claim 25, wherein determining whether the selected I/O command meets the selection criteria comprises:
  estimating a seek time to move from a track of the determined reference position to the track of the selected I/O command; and
  estimating a rotational time to move from a sector number of the determined reference position to the sector number of the selected I/O command, wherein the selection criteria selects an I/O to minimize throughput.

33. The article of manufacture of claim 32, wherein determining whether the selected I/O command meets the selection criteria further comprises determining whether the estimated seek time is greater than the estimated rotational time.

34. The article of manufacture of claim 25, wherein a determining sector number is the sector number used to determine a bucket associated with an I/O command such that the determining sector number is within the range of sector numbers comprising the associated bucket, and wherein selecting an I/O command within the selected bucket to apply the selection criteria comprises selecting an I/O command such that the determining sector number of the selected I/O command is the minimum value of the determining sector numbers of all the not yet considered I/O commands in the selected bucket.

35. The article of manufacture of claim 34, wherein the determined sector number is a sector number at which the I/O command begins.

36. The article of manufacture of claim 34, wherein I/O commands are ordered in a queue in a bucket according to sector number used to determine the associated bucket, and wherein selecting an I/O command in the bucket to consider comprises selecting the I/O command in the queue following the previously selected command.

* * * * *